United States Patent
Prakash et al.

(10) Patent No.: US 11,042,712 B2
(45) Date of Patent: Jun. 22, 2021

(54) SIMPLIFYING AND/OR PARAPHRASING COMPLEX TEXTUAL CONTENT BY JOINTLY LEARNING SEMANTIC ALIGNMENT AND SIMPLICITY

(71) Applicant: KONINKLIJKE PHILIPS N.V., Eindhoven (NL)

(72) Inventors: Aaditya Prakash, Waltham, MA (US); Sheikh Sadid Al Hasan, Cambridge, MA (US); Oladimeji Feyisetan Farri, Yorktown Heights, NY (US); Vivek Varma Datla, Ashland, MA (US)

(73) Assignee: Koninklijke Philips N.V., Eindhoven (NL)

( * ) Notice: Subject to any disclaimer, the term of this patent is extended or adjusted under 35 U.S.C. 154(b) by 106 days.

(21) Appl. No.: 16/430,676

(22) Filed: Jun. 4, 2019

(65) Prior Publication Data

US 2019/0370336 A1 Dec. 5, 2019

Related U.S. Application Data

(60) Provisional application No. 62/680,660, filed on Jun. 5, 2018.

(51) Int. Cl.
*G06F 17/00* (2019.01)
*G06F 40/30* (2020.01)
(Continued)

(52) U.S. Cl.
CPC ............. *G06F 40/30* (2020.01); *G06F 40/40* (2020.01); *G06N 3/0445* (2013.01); *G06N 3/08* (2013.01)

(58) Field of Classification Search
CPC .......... G06F 40/30; G06F 40/40; G06F 40/56; G06N 3/08; G06N 3/0445; G06N 5/02; G06N 3/084; G06N 3/0454
See application file for complete search history.

(56) References Cited

U.S. PATENT DOCUMENTS 6,871,174 B1 * 3/2005 Dolan ............... G06F 40/30 704/9
10,380,236 B1 * 8/2019 Ganu ............... G06F 40/126
(Continued)

FOREIGN PATENT DOCUMENTS

WO 2017130089 A1 8/2017

OTHER PUBLICATIONS

Prakash, et al, "Neural Paraphrase Generation with Stacked Residual LSTM Networks", Proceedings of COLING 2016, the 26th International Conference on Computational Linguistics: Technical Papers, Osaka, Japan, Dec. 11-17, 2016, pp. 2923-2934. (Year: 2016).*
(Continued)

*Primary Examiner* — Laurie A Ries

(57) ABSTRACT

Techniques are described herein for training machine learning models to simplify (e.g., paraphrase) complex textual content by ensuring that the machine learning models jointly learn both semantic alignment and notions of simplicity. In various embodiments, an input textual segment having multiple tokens and being associated with a first measure of simplicity may be applied as input across a trained machine learning model to generate an output textual segment. The output textual segment may be is semantically aligned with the input textual segment and associated with a second measure of simplicity that is greater than the first measure of simplicity (e.g., a paraphrase thereof). The trained machine learning model may include an encoder portion and a decoder portion, as well as control layer(s) trained to maximize the second measure of simplicity by replacing token(s) of the input textual segment with replacement token(s).

20 Claims, 5 Drawing Sheets

(51) Int. Cl.
*G06N 3/08* (2006.01)
*G06N 3/04* (2006.01)
*G06F 40/40* (2020.01)

(56) References Cited

U.S. PATENT DOCUMENTS

| | | | | |
|---|---|---|---|---|
| 10,909,313 | B2* | 2/2021 | Can | G06K 9/3233 |
| 2014/0279729 | A1* | 9/2014 | Delaney | G06N 5/02 |
| | | | | 706/12 |
| 2016/0350655 | A1* | 12/2016 | Weiss | G06F 40/35 |
| 2016/0364476 | A1* | 12/2016 | Gurin | G06F 40/268 |
| 2017/0262735 | A1* | 9/2017 | Ros Sanchez | G06K 9/4628 |
| 2018/0061408 | A1* | 3/2018 | Andreas | G10L 15/063 |
| 2018/0114522 | A1* | 4/2018 | Hall | G10L 13/047 |
| 2018/0144214 | A1* | 5/2018 | Hsieh | G06N 3/08 |
| 2018/0174020 | A1* | 6/2018 | Wu | G06N 3/08 |
| 2018/0197098 | A1* | 7/2018 | Subbian | G06Q 50/01 |
| 2018/0341839 | A1* | 11/2018 | Malak | G06K 9/4628 |
| 2019/0236139 | A1* | 8/2019 | DeFelice | G06N 3/0472 |

OTHER PUBLICATIONS

Chi, et al., "On the Importance of Network Architecture in Training Very Deep Neural Networks", 6th IEEE International Conference on Signal Processing, Communications and Computing (ICSPCC), Hong Kong, Aug. 5-8, 2016, 5 pages.

Song, et al., "Multi Resolution LSTM for Long Term Prediction in Neural Activity Video", Department of Electrical and Computer Engineering, New York University, NY,USA, May 8, 2017, 9 pages. (Abstract).

Gupta, et al., "ReVal: A Simple and Effective Machine Translation Evaluation Metric Based on Recurrent Neural Networks", Proceedings of the 2015 Conference on Empirical Methods in Natural Language Processing, Lisbon, Portugal, Sep. 17-21, 2015, pp. 1066-1072.

Prakash, et al., "Neural Paraphrase Generation with Stacked Residual LSTM Networks", Proceedings of COLING 2016, the 26th International Conference on Computational Linguistics: Technical Papers, Osaka, Japan, Dec. 11-17, 2016, pp. 2923-2934.

* cited by examiner

<
"A neoplasm was observed withing the endocranium";  ← 130A
"There is a growth detected in the base of the skull";  ← 130B
neoplasm: "tumor," "sarcoma," "tumefaction," "growth";  ← 130C
endocranium: "base of the skull," "skull base," "skull"  ← 130D
observed: "detected," "seen," "found," "located"  ← 130E
>

SIMPLIFYING AND/OR PARAPHRASING COMPLEX TEXTUAL CONTENT BY JOINTLY LEARNING SEMANTIC ALIGNMENT AND SIMPLICITY

CROSS-REFERENCE TO RELATED APPLICATION

The present application claims priority to and the benefit of U.S. Provisional Application Ser. No. 62/680,660, filed Jun. 5, 2018, which is hereby incorporated by reference herein.

TECHNICAL FIELD

Various embodiments described herein are directed generally to text simplification and/or paraphrasing. More particularly, but not exclusively, various methods and apparatus disclosed herein relate to training machine learning models that simplify and/or paraphrase complex textual content by ensuring that the machine learning models jointly learn both semantic alignment and simplicity.

BACKGROUND

Text simplification is a monolingual translation task that involves rephrasing (i.e., "paraphrasing") textual content, such as a sentence, paragraph, document, etc., to generate new textual content that is simpler both semantically and lexically compared to the original textual content. However, simplicity of textual content is not a well-defined metric. Consequently, it is difficult to develop a model which can accurately generate simplified textual content based on complex textual content. Conventional techniques for text simplification use statistical approaches for lexically substituting "complex" words with "simpler" words. They also try to reduce the length of the generated textual content by deleting redundant words and/or phrases. These techniques are not scalable because they require manual generation of the replacement rules. Statistical machine learning tools for text simplification have thus far suffered because, being monolingual translation techniques, they do not encourage diversity in the text generation, and there is no way to guarantee semantic alignment between the generated textual content (output) and the original textual content (input).

SUMMARY

The present disclosure is directed to methods and apparatus for training machine learning models that simplify and/or paraphrase complex textual content by ensuring that the machine learning models jointly learn both semantic alignment and simplicity. For example, in various embodiments, an input textual segment having multiple tokens and being associated with a first measure of simplicity may be applied as input across a trained machine learning model to generate an output textual segment. The output textual segment may be is semantically aligned with the input textual segment and associated with a second measure of simplicity that is greater than the first measure of simplicity (e.g., a paraphrase thereof). The trained machine learning model may include an encoder portion and a decoder portion, as well as control layer(s) that are trained to maximize the second measure of simplicity by replacing token(s) of the input textual segment with replacement token(s).

Generally, in one aspect, a method may include: obtaining an input textual segment comprising a plurality of tokens, wherein the input textual segment is associated with a first measure of simplicity; and applying data indicative of the input textual segment as input across a trained machine learning model to generate an output textual segment, wherein the output textual segment is semantically aligned with the input textual segment and is associated with a second measure of simplicity that is greater than the first measure of simplicity. In various embodiments, the trained machine learning model may include an encoder portion and a decoder portion, and one or more control layers between the encoder portion and the decoder portion. In various embodiments, the control layers may be trained to maximize the second measure of simplicity by replacing one or more tokens of the plurality of tokens of the input textual segment with one or more replacement tokens.

In another aspect, a method for training one of the aforementioned machine learning models may include: obtaining a plurality of training examples, wherein each training example includes an input textual segment and a target textual segment, wherein the input textual segment comprises a plurality of tokens, at least some of the plurality of tokens including annotations that identify one or more candidate replacement tokens, and wherein the input textual segment is associated with a first measure of simplicity, and wherein the target textual segment comprises another plurality of tokens, at least one of the another plurality of tokens comprising one or more of the candidate replacement tokens, and wherein the target textual segment is associated with a second measure of simplicity that is greater than the first measure of simplicity; for each of the plurality of training examples, training a machine learning model by performing the following operations: applying the input textual segment as input across the machine learning model to generate output, wherein the machine learning model comprises an encoder portion, a decoder portion, and one or more control layers between the encoder portion and the decoder portion; comparing the output to the target textual segment; and training the machine learning model based on the comparing, wherein the training includes training the one or more control layers to replace one or more tokens of the input textual segment with one or more of the candidate replacement tokens.

In various embodiments, the encoder portion and the decoder portion each includes at least one long short-term memory ("LSTM") network. In various embodiments, the one or more control layers may include a feed-forward neural network. In various embodiments, the training may further include training the encoder portion to generate, based on data indicative of a subsequent input textual segment, a feature vector that captures one or more semantic concepts conveyed in the subsequent input textual segment. In various embodiments, the training may further include training the decoder portion to generate, based on the feature vector, as a subsequent output textual segment that is semantically aligned with the subsequent input textual segment. In various embodiments, the subsequent output textual segment may include a paraphrase of the subsequent input textual segment. In various embodiments, the machine learning model may further include a residual skip connection that is controlled by the one or more control layers. In various embodiments, the training may be performed using a combined loss function of Emb greedy.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods, and/or to store machine learning models trained using any of the aforementioned methods.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating various principles of the embodiments described herein.

DETAILED DESCRIPTION

Text simplification is a monolingual translation task that involves rephrasing (i.e., "paraphrasing") textual content, such as a sentence, paragraph, document, etc., to generate new textual content that is simpler both semantically and lexically compared to the original textual content. However, simplicity of textual content is not a well-defined metric. Consequently, it is difficult to develop a model which can accurately generate simplified textual content based on complex textual content. Conventional techniques are not scalable because they require manual generation of the replacement rules. Statistical machine learning tools for text simplification have also thus far suffered because, being monolingual translation techniques, they do not encourage diversity in the text generation, and there is no way to guarantee semantic alignment between the generated textual content (output) and the original textual content (input). In view of the foregoing, various embodiments and implementations of the present disclosure are directed to training machine learning models that simplify and/or paraphrase complex textual content by ensuring that the machine learning models jointly learn both semantic alignment and simplicity.

Figures 1A, 1B:
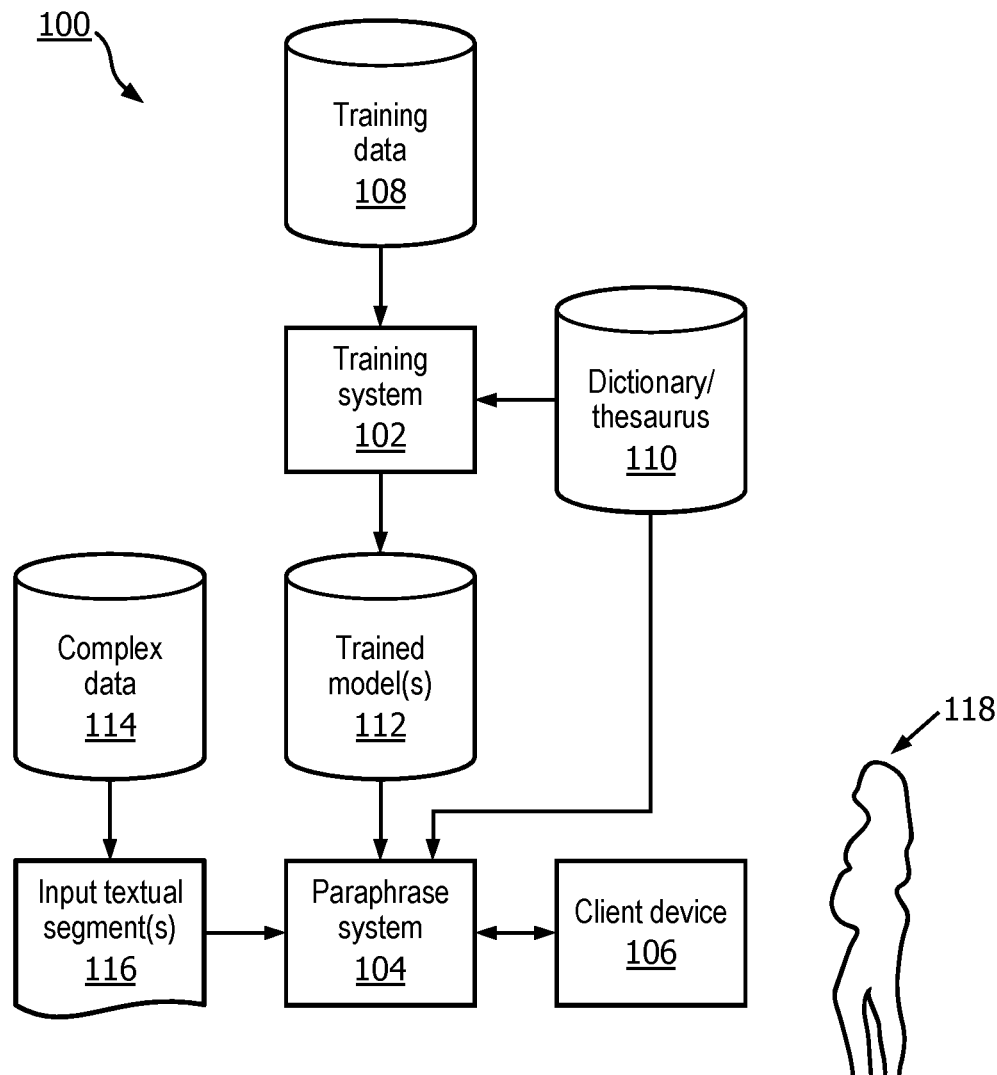
FIG. 1A illustrates an example environment which selected aspects of the present disclosure may be implemented, in accordance with various embodiments.
FIG. 1B depicts a training example that may be used to train a machine learning model in accordance with various embodiments.

Referring to FIG. 1A, an example environment 100 is depicted schematically, showing various components that may be configured to perform selected aspects of the present disclosure. One or more of these components may be implemented using any combination of hardware or software. For example, one or more components may be implemented using one or more microprocessors that execute instructions stored in memory, a field-programmable gate array ("FPGA"), and/or an application-specific integrated circuit ("ASIC"). The connections between the various components represent communication channels that may be implemented using a variety of different networking technologies, such as Wi-Fi, Ethernet, Bluetooth, USB, serial, etc. In embodiments in which the depicted components are implemented as software executed by processor(s), the various components may be implemented across one or more computing systems that may be in communication over one or more networks (not depicted).

In this example, environment includes a training system 102, a paraphrase system 104, and one or more client devices 106. Client device(s) 106 (and other client devices described herein) may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. Training system 102 and/or paraphrase system 104 may be implemented using any combination of hardware and software, and in some embodiments are implemented by one or more servers forming what is often referred to as a "cloud" or "cloud computing system."

In various embodiments, training data 108 may be used, e.g., by training system 102, to train one or more machine learning models 112. These machine learning models may take various forms, including various types of neural networks, such as feed-forward neural networks, convolutional neural networks ("CNN"), recurrent neural networks ("RNN"), long short-term memory ("LSTM") networks, gated recurrent units ("GRU"), and so forth. In some embodiments, training system 102 may rely on a dictionary and/or thesaurus 110 in order to identify, for instance, candidate replacement tokens that may be used to replace tokens in source data for simplification purposes (described below). In some embodiments, dictionary/thesaurus 110 may be a conventional, database prepopulated with words and/or their synonyms/antonyms. Additionally or alternatively, in some embodiments, dictionary/thesaurus 110 may be populated during training, and hence may only include candidate replacement tokens that were contained in at least one training example.

Once trained, the machine learning models 112 may be used, e.g., by paraphrase system 104, to generate "simplified" versions of what are considered to be relatively "complex" input textual segments 116. In various embodiments, "textual segments" (whether input or output) may be multiple words (or "tokens") that form, for instance, a sentence. In some embodiments, input textual segments 116 (or "sentences") may be extracted from one or more corpuses of documents that are collectively deemed "complex data" 114, e.g., because they are composed by and/or for highly-educated and/or trained people such as doctors, scientists, researchers, engineers, lawyers, accountants, etc. These complex data 114 may include, for instance, technical literature, medical literature, medical documents composed by clinicians (e.g., free-form clinical notes forming part of electronic health records), annotations and/or captions of images, financial documents, legal documents (e.g., contracts, court decisions, etc.), and so forth. For example, in some embodiments, the input textual segments may be captions and/or annotations of medical images such as X-rays, ultrasound images, electrocardiogram ("ECG") images, magnetic resonance imaging ("MRI") scans, computed tomography ("CT") scans, etc. In some embodiments, punctuations may be used as tokens so that the system can split appositives, clauses, parentheticals, etc. into smaller sentences.

Paraphrase system 104 may use one or more trained models 112, as well as dictionary thesaurus 110, to generate alternative versions (i.e. output textual segments) of input textual segments 116 that are nonetheless semantically aligned with the input textual segments 116. For example, in some implementations, paraphrase system 104 may generate paraphrases of input textual segments 116. The purpose of paraphrasing is to preserve the semantic meaning of the input textual segment 116 (e.g., a sentence) while "simplifying" it, e.g., by reducing its length (i.e. token reduction) and/or using tokens and/or phrases that are deemed to be simpler that those found in the input textual segment 116. In some embodiments, a training metric may be employed which encourages the machine learning model(s) 112 to seek diversity when paraphrasing while keeping the vocabulary of the generated paraphrases close to a distribution of simple language (e.g., English). By training machine learning models 112 using "earthmover" distance, the distribution of the generated paraphrases is forced to be at least some distance away from the "source" distribution—e.g., complex English—of the input textual segment.

Input textual segments 116 may be considered "complex," and conversely, the generated output (e.g., paraphrases) may be considered "simpler," based on various metrics. In some embodiments, a combination of various readability metrics may be employed. For example, Flesch-Kincaid scores (e.g., Reading Ease and/or Grade level) may use measures such as word length and/or sentence length to indicate how difficult an input textual segment 116 is to understand. Additionally or alternatively, other readability metrics, such as Kucera-Francis scores and/or Lexile scores, may be employed. Additionally or alternatively, in some embodiments, statistical measures such as BLEU, Emb Greedy, METEOR, etc., may be employed to assign measures of simplicity (or conversely, measures of complexity) to textual segments.

In some embodiments, training data 108 may include source textual segments which may be relatively complex, e.g., having relatively low measures of simplicity and/or relatively high measures of complexity, and target textual segments which may be relatively simple, e.g., having relatively high measures of simplicity and/or relatively low measures of complexity. For purposes of explanation and simplicity, these textual segments will be referred to herein as "sentences," but it should be understood that other combinations of multiple tokens may be used as textual segments, such as clauses, paragraphs, etc.

FIG. 1B depicts one training example that may be used to train one or more machine learning models in the medical context, e.g., to generate simplified versions of relatively complex clinical notes (e.g., paraphrasing). In this example, the source sentence 130A is "A neoplasm was observed within the endocranium. This is the sort of language that might be composed by one clinician for the benefit of another clinician, but not necessarily for a layperson. The target sentence 130B (e.g., desired paraphrase), by contrast, reads, "There is a growth detected in the base of the skull." This paraphrase is simpler than the source sentence and thus is more likely to be understood by a layperson, such as a patient 118 that operates client device 106 in FIG. 1A to access paraphrase system 104 and attempt to understand her medical records. While not depicted in FIG. 1A, in some implementations, paraphrase system 104 may actually be part of a larger medical portal that patients access to view their medical information.

Referring back to FIG. 1B, other information is included with the training example as well. One or more candidate replacement tokens (e.g., synonyms) are provided for multiple tokens in source sentence 130A. For example, for the token "neoplasm," multiple replacement candidates are provided: "tumor," "sarcoma," "tumefaction," "growth." For the token "endocranium," multiple replacement candidates are provided: "base of the skull," "skull base," "skull." The same goes for "observed": "detected," "seen," "found," "located."

In some embodiments, training system 102 may train one or more machine learning models using the training example of FIG. 1B as follows. The source sentence 130A may be applied as input across the machine learning model. For example, if the machine learning model comprises one or more LSTM networks (e.g., stacks of LSTM networks), then one or more tokens of the source sentence 130A may be applied as input across the one or more LSTM networks at each time increment. In some embodiments, bi-directional LSTM networks may be employed, in which case the source sentence 130A may be applied both in forward and reverse. The output of the one or more LSTM networks, e.g., at the end of the number of time steps required to increment through source sentence 130A, may be compared to the target sentence 130B. Based on this comparison, a loss function may be optimized, and various weights and/or other parameters (e.g., gates) of the LSTM network(s) may be altered, e.g., using standard techniques such as stochastic gradient descent and/or back propagation.

In some embodiments, the machine learning model(s) 112 that are trained by training system 102 may include one or more "control" layers that are trained, for instance, to control a residual skip connection associated with the machine learning model(s). These one or more control layers may be trained, for instance, to take various actions on particular tokens and/or phrases, such as delete word(s), add word(s), replace word(s) (e.g., with synonyms), and/or randomly reorder an entire sentence, e.g., to achieve greater simplicity. More generally, in some implementations, the control layer(s) and/or the entire machine learning model may be trained to minimize an "earthmover" distance between source sentence 130A and target sentence 130B and/or to minimize a distance between target sentence 130B and a language distribution associated with relative simplicity. Thus, when trained as described herein, the machine learning models 112 (including the control layers) may jointly learn semantic alignment (i.e., preserving the semantic meaning of source sentence 130A in target sentence 130B) and simplicity.

In some embodiments, the target sentence 130B may be used for supervised training of the machine learning models 112. Of particular relevance to the present disclosure, the target sentence 130B may be used to train the control layers described previously to selectively replace, detect, and/or add token(s) for the target sentence. As see in FIG. 1B, the tokens "neoplasm," "endocranium," and "observed" in source sentence 130A are replaced in target sentence 130B with "growth," "base of the skull," and "detected," respectively. During training these replacements may serve as signals that, at least in the semantic context of source sentence 130A, it is more desirable to replace source tokens with some candidate replacement tokens than others. For example, it may be better in this context to replace "neoplasm" with "growth" than with "tumor" (which could induce panic in a patient), "sarcoma," or "tumefaction" (the latter two which may not be readily understood by a layperson). Similarly, it may be better in this context to replace "observed" with "detected."

Figure 2:
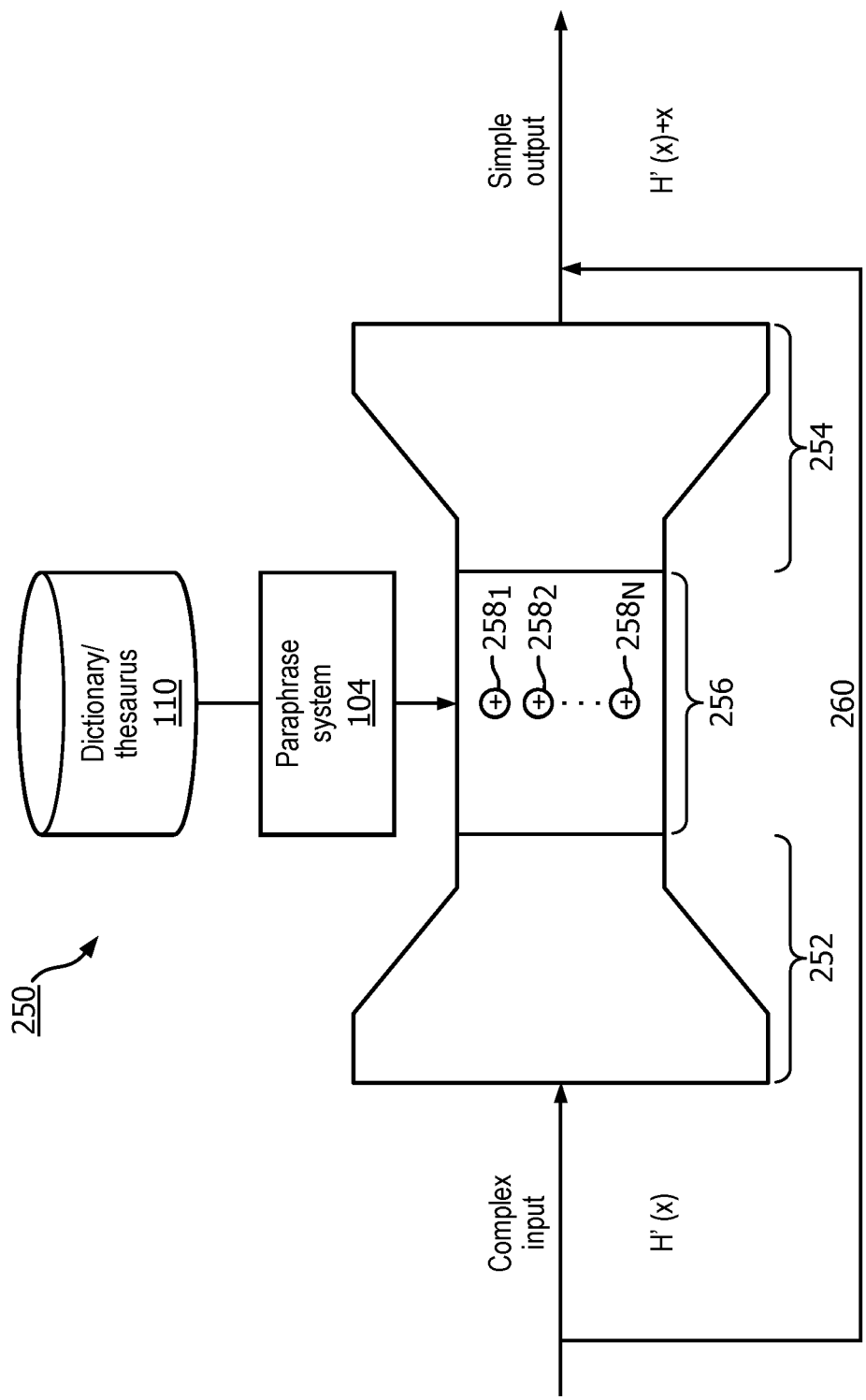
FIG. 2 depicts an example machine learning model architecture, in accordance with various embodiments.

FIG. 2 schematically depicts one example of a machine learning model 250 that may be generated, for instance, by training system 102 and used, for instance, by paraphrase system 104, to generate simple output (e.g., to paraphrase) based on relatively complex input. In this example, machine learning model 250 includes an encoder portion 252 and a decoder portion 254. In between encoder portion 252 and decoder portion 254 are is a control layer portion 256 that includes one or more control layers 258. In some implementations, each control layer 258 may be referred to as a "gate," though this should not be confused with gates employed by individual LSTM network cells (i.e., input, output, forget).

The various constituent components of machine learning model 250 may be implemented in various ways. In some embodiments, each of encoder portion 252 and decoder portion 254 may include one or more (e.g., a stack of) LSTM networks, which may be unidirectional and/or bidirectional. Control layer portion 256 may also take various forms, such as one or more feed-forward neural networks.

Figure 3:
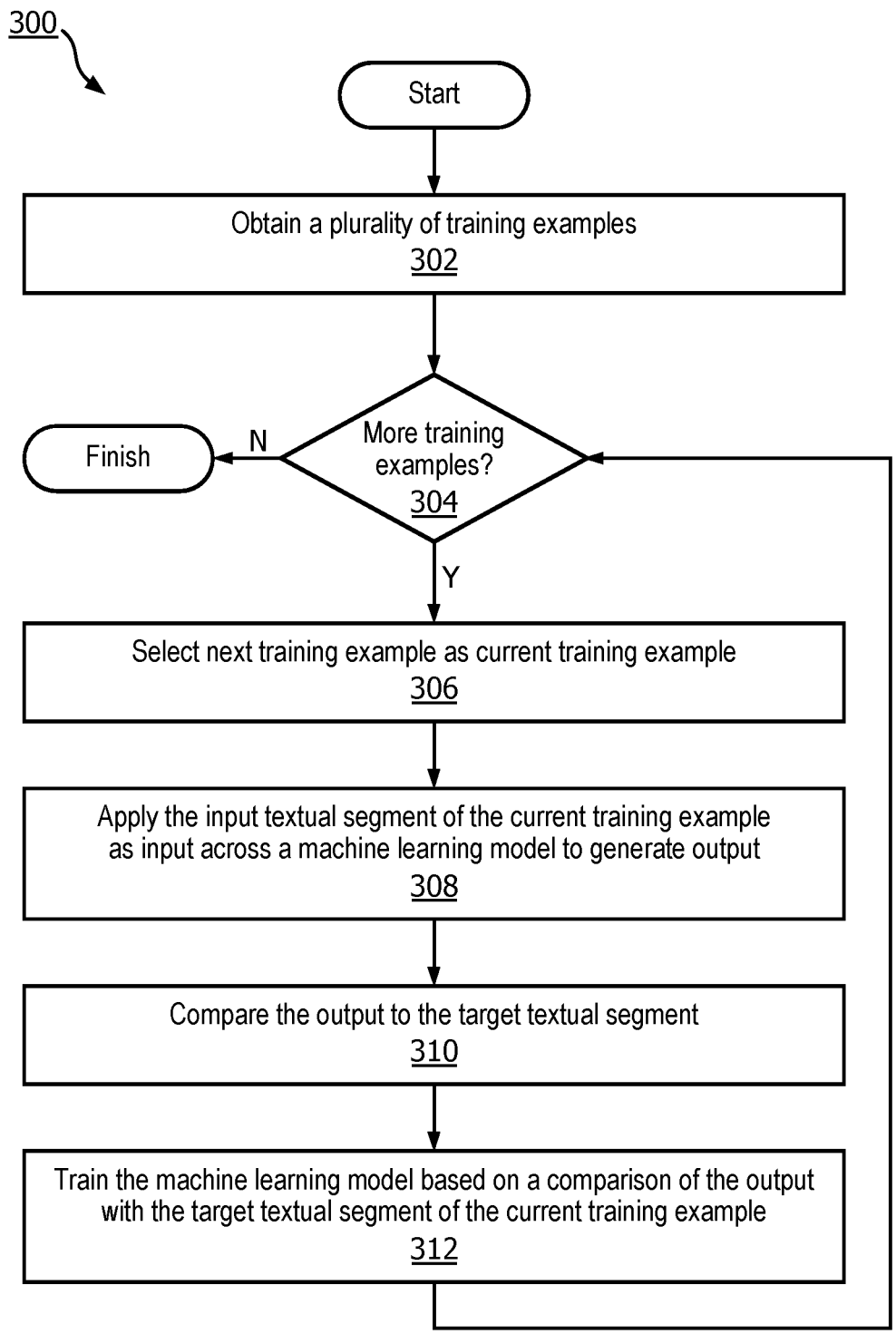
FIG. 3 depicts an example method for training one or more models, in accordance with various embodiments described herein.

In various embodiments, each control layer 258 may serve a particular function. In FIG. 3, for instance, there are N individual control layers 258. In some embodiments, they may control one or more residual skip connections 260 that, for instance, pass or don't pass an embedding of a source token to and/or past decoder portion 254. A first control layer 258I may be trained to replace individual tokens of an input textual segment (116 in FIG. 1A) with a candidate replacement token (e.g., a synonym). In some embodiments, dictionary/thesaurus 110 may be provided and accessible to paraphrase system 104 so that it is able to identify candidate replacement tokens that may be used to replace tokens from a source sentence.

A second control layer $258_2$ may be trained, for instance, to delete one or more words from an input textual segment. As an example, a sentence may include one or more words/phrases that might be considered relatively redundant. Second control layer $258_2$ may be trained to reduce such redundancies. For example, suppose second control layer $258_2$ identifies two tokens that are relatively redundant. In various embodiments, the token that is more likely to cause the output sentence to be more complex (or less simple) may be deleted, and the "simpler" token may be preserved.

In some embodiments, another control layer 258 may be trained to add one or more words or phrases to the generated output. For instance, in the training example of FIG. 1B, the single word "endocranium" is replaced with multiple words, "base of the skull," which may be easier for a layperson to readily understand. In some embodiments, yet another control layer may be trained to randomly reorder tokens of an input textual segment, e.g., so that the reordered segment can be evaluated for complexity. In some such embodiments, an indices of words in a source sentence, e.g., 4 1 3 2 6, may be obtained, and then the control layer 258 may try to find a different combination of these indices, e.g., 3 1 4 2 6, that is simpler (e.g., higher likelihood of occurring in the given language). For example, the complexity of the two sentences may be compared to determine which is simpler.

FIG. 3 depicts an example method 300 for practicing selected aspects of the present disclosure, including training a machine learning model to generate paraphrases of relatively complex input textual segments, in accordance with various embodiments. For convenience, the operations of the flow chart are described with reference to a system that performs the operations. This system may include various components of various computer systems, including training system 102. Moreover, while operations of method 300 are shown in a particular order, this is not meant to be limiting. One or more operations may be reordered, omitted or added.

At block 302, the system may obtain a plurality of training examples. As shown in FIG. 1B, in various embodiments, each training example may include an input textual segment (130A) and a target textual segment (130B). As described previously, the input textual segment may include a plurality of tokens (e.g., words, punctuations), and at least some of the plurality of tokens may include and/or be associated with annotations (e.g., 130C-E) that identify one or more candidate replacement tokens. In some embodiments, the input textual segment may be associated with a first measure of simplicity and/or with a first measure of complexity.

In various embodiments, the target textual segment may include another plurality of tokens, at least one of which includes one or more of the candidate replacement tokens associated with the input textual segment (e.g., to ensure the control layers are trained to replace at least one token). The target textual segment may be associated with a second measure of simplicity that is greater than the first measure of simplicity, and/or may be associated with a second measure of complexity that is less than the first measure of complexity associated with the input textual segment.

In some embodiments, the plurality of training examples may include simple-complex sentence pairs obtained from sources such as PWKP and/or the Paragraph Database ("PPDB") made available at paragraph.org. In some implementations, data from a monolingual pair of corpora may be preprocessed to generate complex-to-simple aligned sentences. Additionally or alternatively, curated and/or propriety datasets of complex-simple sentence (or paragraph) pairs may be used.

Referring back to FIG. 3, a machine learning model training loop begins at block 304 when the system determines whether there are remaining training examples to be processed. If the answer at block 304 is yes, then method 300 may proceed to block 306. At block 306, the system may select a next training example as a current training example. At block 308, the system may apply the input textual segment of the current training example as input across the machine learning model to generate output. As noted above, the machine learning model may include an encoder portion, a decoder portion, and one or more control layers between the encoder portion and the decoder portion.

At block 310, the system may compare the output generated at block 308 to the target textual segment associated with the current training example. As described previously, in some embodiments the target textual segment may include tokens that align with particular candidate replacement tokens forming part of (e.g., annotations, additional fields/features, etc.) of the current training example. Consequently, in similar contexts moving forward, these particular candidate replacement tokens may be favored over other candidate replacement tokens found in the current training example.

At block 312, the system may train the machine learning model based on the comparing of block 310. In various embodiments, the training may include training the one or more control layers to replace one or more tokens of the input textual segment of the current training example with one or more of the candidate replacement tokens of the current training example. In some embodiments, the training may further include training the encoder portion (e.g., 252) to generate, based on data indicative of a subsequent input textual segment (e.g., to be paraphrased after the machine learning model is trained), a feature vector that captures one or more semantic concepts conveyed in the subsequent input textual segment. Additionally, the training may further include training the decoder portion (e.g., 254) to generate, based on this feature vector, a subsequent output textual segment that is semantically aligned with the subsequent input textual segment, but simpler (e.g., shorter, different number of words, less complex words, etc.). Method 300 may then proceed back to block 304, and the loop may continue until all training examples are processed.

Figure 4:
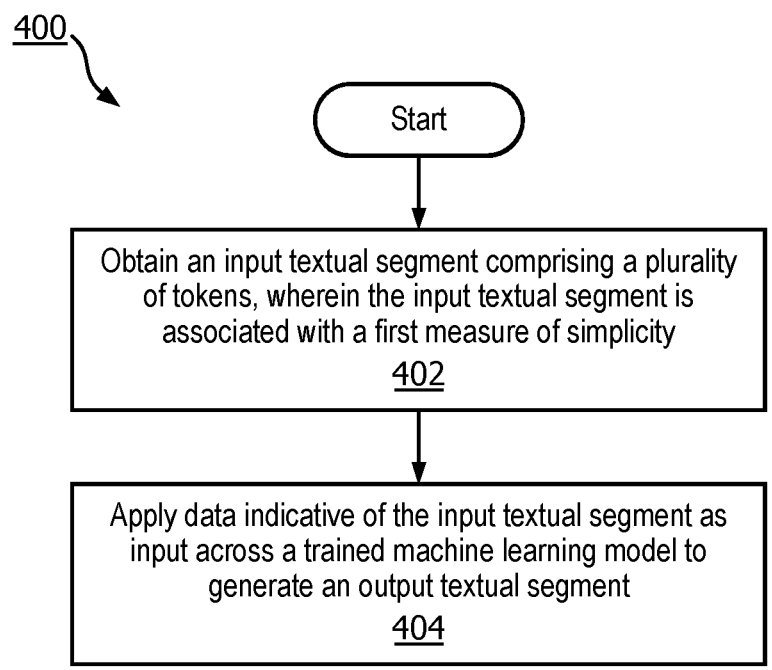
FIG. 4 depicts an example method for utilizing one or more models trained using the method of FIG. 3, in accordance with various embodiments.

FIG. 4 depicts an example method 400 for practicing selected aspects of the present disclosure, including applying a machine learning model trained using a technique such as that depicted in FIG. 3 to generate paraphrases of relatively complex input textual segments, in accordance with various embodiments. For convenience, the operations of the flow chart are described with reference to a system that performs the operations. This system may include various components of various computer systems, including paraphrase system 104. Moreover, while operations of method 400 are shown in a particular order, this is not meant to be limiting. One or more operations may be reordered, omitted or added.

At block 402, the system, e.g., by way of paraphrase system 104, may obtain an input textual segment that includes a plurality of tokens. The input textual segment may be associated with a first measure of simplicity (or complexity) that indicates that it is relatively complex. For example, the input textual segment may be prose composed by a professional such as a doctor, lawyer, scientist, engineer, etc. that contains jargon, complex words/phrases, technical terms, excessive detail, etc. These types of prose may not be readily understandable by a person such as a patient, client, etc., who may nonetheless wish to be able to understand them at least to some degree. For example, a patient may wish to understand a note composed by the patient's doctor for an audience other than the patient, such as another doctor, a pharmacist, etc.

In some embodiments, the input textual segment obtained at block 402 may be obtained from an end user (e.g., patient 118) in FIG. 1A. For example, when operating client device 106 to connect to a patient portal and view medical information, patient 118 may see a document such as a clinician note, an annotated medical image, with a textual statement that patient 118 does not understand. Patient 118 may copy this statement and, for instance, paste it into a "paraphrase" field of the patient portal and press "submit." As another example, one or more documents (e.g., electronic medical records) obtained, for instance, from a hospital information system may be "pre-paraphrased" prior to be made available on the portal, so that patient 118 need not take any action in order to view simplified versions of text composed by her clinicians. In yet other embodiments, complex documents may be paraphrased, e.g., in batches, and then made available to interested users as needed/on demand.

At block 404, the system may apply data indicative of the input textual segment as input across a machine learning model trained using method 300 to generate an output textual segment. In various embodiments, the data indicative of the input textual segment may include, for instance, the textual segment itself, a reduced dimensionality embedding of the input textual segment, a "bag-of-words" generated from the input textual segment, etc. In various embodiments, the output textual segment may be semantically aligned with the input textual segment and may be associated with a second measure of simplicity that is greater than the first measure of simplicity, and/or with a second measure of complexity that is less than the first measure of complexity.

As described previously, in various embodiments, the trained machine learning model includes an encoder portion and a decoder portion, as well as one or more control layers between the encoder portion and the decoder portion. In some embodiments, the control layer(s) may be trained to maximize the second measure of simplicity associated with the output textual segment by replacing one or more tokens of the plurality of tokens of the input textual segment with one or more replacement tokens. Additionally or alternatively, in some embodiments, the control layers may perform other operations, such as adding/deleting words, or in some cases, randomly reordering tokens of the input textual segment to determine whether the reordered result is simpler. In some embodiments, if the input textual segment is deemed, in its native form, to be sufficiently simple, e.g., by having an associated measure of simplicity that satisfies a threshold, then it may not be altered.

Figure 5:
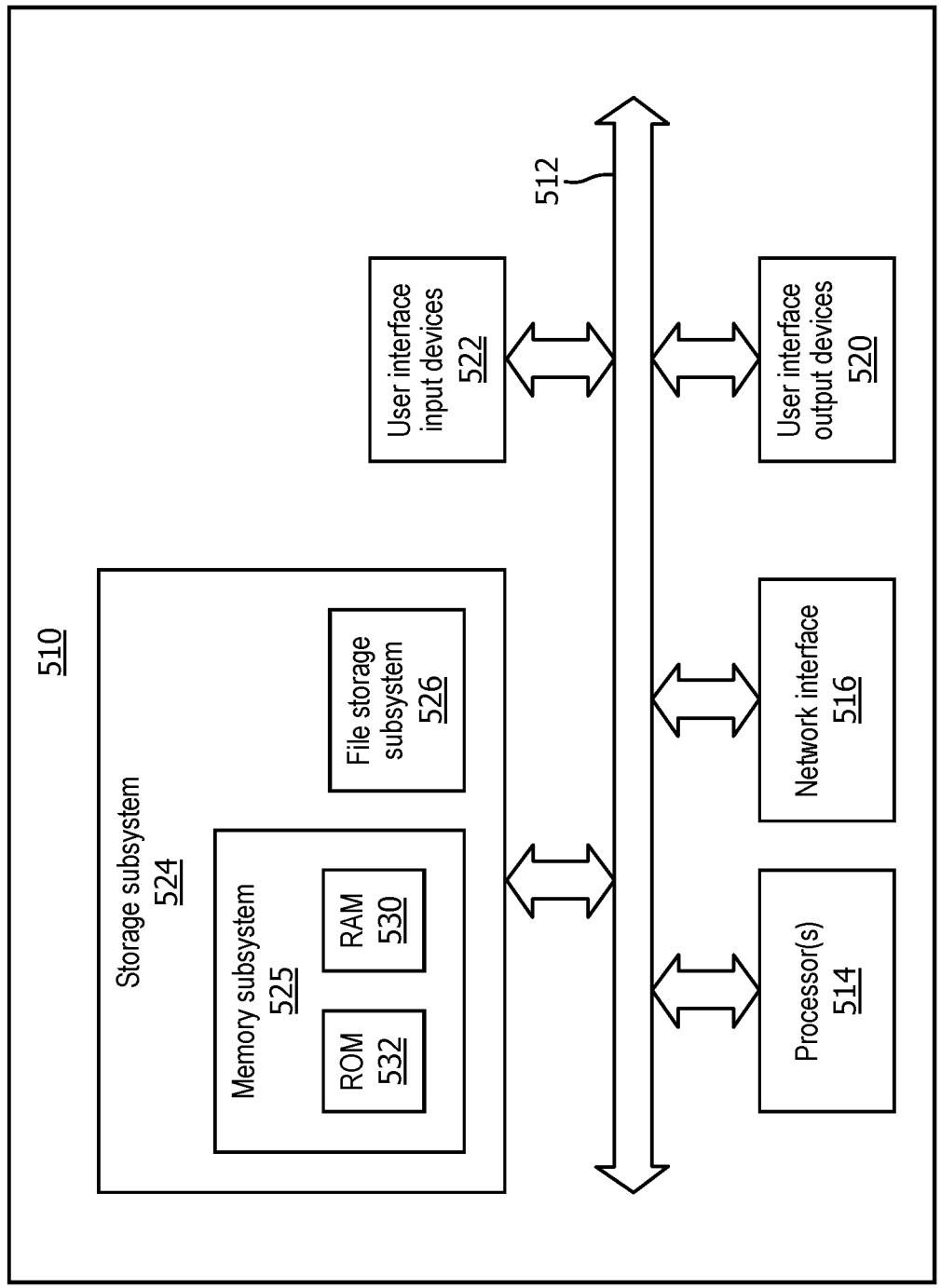
FIG. 5 depicts an example computing system architecture.

FIG. 5 is a block diagram of an example computing device 510 that may optionally be utilized to perform one or more aspects of techniques described herein. In some implementations, one or more of a client computing device and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 3 and 4, as well as to implement various components depicted in FIGS. 1A and 2.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A method implemented using one or more processors, comprising:
    obtaining an input textual segment comprising a plurality of tokens, wherein the input textual segment is associated with a first measure of simplicity;
    applying data indicative of the input textual segment as input across a trained machine learning model to generate an output textual segment, wherein the output textual segment is semantically aligned with the input textual segment and is associated with a second measure of simplicity that is greater than the first measure of simplicity;
    wherein the trained machine learning model includes an encoder portion and a decoder portion, and a plurality of control layers between the encoder portion and the decoder portion, wherein at least one of the control layers is trained to maximize the second measure of simplicity by replacing one or more tokens of the plurality of tokens of the input textual segment with one or more replacement tokens, and wherein at least one of the control layers is trained to maximize the second measure of simplicity by removing one or more tokens of the plurality of tokens of the input textual segment.

2. The method of claim 1, wherein the encoder portion is trained to generate, based on data indicative of the input textual segment, a feature vector that captures one or more semantic concepts conveyed in the input textual segment, and the decoder portion is trained to generate, based on the feature vector, as the output textual segment, a paraphrase of the input textual segment.

3. The method of claim 1, wherein the encoder portion and the decoder portion each includes at least one long short-term memory ("LSTM") network.

4. The method of claim 3, wherein the plurality of control layers comprise a feed-forward neural network.

5. The method of claim 1, wherein the trained machine learning model further includes a residual skip connection that is controlled by the at least one of the plurality of control layers.

6. The method of claim 1, wherein the trained machine learning model is trained using a combined loss function of Emb greedy.

7. A method implemented using one or more processors, comprising: obtaining a plurality of training examples, wherein each training example includes an input textual segment and a target textual segment,
    wherein the input textual segment comprises a plurality of tokens, at least some of the plurality of tokens including annotations that identify one or more candidate replacement tokens, and wherein the input textual segment is associated with a first measure of simplicity, and
    wherein the target textual segment comprises another plurality of tokens, at least one of the another plurality of tokens comprising one or more of the candidate replacement tokens, and wherein the target textual segment is associated with a second measure of simplicity that is greater than the first measure of simplicity;
    for each of the plurality of training examples, training a machine learning model by performing the following operations:
        applying the input textual segment as input across the machine learning model to generate output, wherein the machine learning model comprises an encoder portion, a decoder portion, and plurality of control layers between the encoder portion and the decoder portion;
        comparing the output to the target textual segment; and
        training the machine learning model based on the comparing, wherein the training includes training at least one of the plurality of control layers to replace one or more tokens of the input textual segment with one or more of the candidate replacement tokens, and wherein the training includes training at least one of the plurality of control layers to maximize the second measure of simplicity by removing one or more tokens of the plurality of tokens of the input textual segment.

8. The method of claim 7, wherein the encoder portion and the decoder portion each includes at least one long short-term memory ("LSTM") network.

9. The method of claim 8, wherein the plurality of control layers comprise a feed-forward neural network.

10. The method of claim 7, wherein the training further includes training the encoder portion to generate, based on data indicative of a subsequent input textual segment, a feature vector that captures one or more semantic concepts conveyed in the subsequent input textual segment.

11. The method of claim 10, wherein the training further includes training the decoder portion to generate, based on the feature vector, as a subsequent output textual segment that is semantically aligned with the subsequent input textual segment.

12. The method of claim 11, wherein the subsequent output textual segment comprises a paraphrase of the subsequent input textual segment.

13. The method of claim 7, wherein the machine learning model further includes a residual skip connection that is controlled by the one or more at least one of the plurality of control layers.

14. The method of claim 7, wherein the training is performed using a combined loss function of Emb greedy.

15. At least one non-transitory computer-readable medium comprising a machine learning model that is trained using the following operations:
    obtaining a plurality of training examples, wherein each training example includes an input textual segment and a target textual segment,
    wherein the input textual segment comprises a plurality of tokens, at least some of the plurality of tokens including annotations that identify one or more candidate replacement tokens, and wherein the input textual segment is associated with a first measure of simplicity, and wherein the target textual segment comprises another plurality of tokens, at least one of the another plurality of tokens comprising one or more of the candidate replacement tokens, and wherein the target textual segment is associated with a second measure of simplicity that is greater than the first measure of simplicity;

for each of the plurality of training examples, training a machine learning model by performing the following operations:

applying the input textual segment as input across the machine learning model to generate output, wherein the machine learning model comprises an encoder portion, a decoder portion, and plurality of control layers between the encoder portion and the decoder portion;

comparing the output to the target textual segment; and training the machine learning model based on the comparing, wherein the training includes training at least one of the plurality of control layers to replace one or more tokens of the input textual segment with one or more of the candidate replacement tokens, and wherein the training includes training at least one of the plurality of control layers to maximize the second measure of simplicity by removing one or more tokens of the plurality of tokens of the input textual segment.

16. The at least one non-transitory computer-readable medium of claim 15, wherein the encoder portion and the decoder portion each includes at least one long short-term memory ("LSTM") network.

17. The at least one non-transitory computer-readable medium of claim 16, wherein the plurality of control layers comprise a feed-forward neural network.

18. The at least one non-transitory computer-readable medium of claim 15, wherein the training further includes training the encoder portion to generate, based on data indicative of a subsequent input textual segment, a feature vector that captures one or more semantic concepts conveyed in the subsequent input textual segment.

19. The at least one non-transitory computer-readable medium of claim 18, wherein the training further includes training the decoder portion to generate, based on the feature vector, as a subsequent output textual segment that is semantically aligned with the subsequent input textual segment.

20. The at least one non-transitory computer-readable medium of claim 19, wherein the subsequent output textual segment comprises a paraphrase of the subsequent input textual segment.

* * * * *